United States Patent
Nakayama et al.

(10) Patent No.: US 10,397,792 B2
(45) Date of Patent: Aug. 27, 2019

(54) CHANNEL ASSIGNMENT APPARATUS, WIRELESS COMMUNICATION SYSTEM, AND CHANNEL ASSIGNMENT METHOD

(71) Applicant: FUJITSU LIMITED, Kawasaki-shi, Kanagawa (JP)

(72) Inventors: Takayoshi Nakayama, Kawasaki (JP); Kazuyuki Ozaki, Yokohama (JP); Hiroshi Fujita, Yokosuka (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 15/790,778

(22) Filed: Oct. 23, 2017

(65) Prior Publication Data

US 2018/0049035 A1 Feb. 15, 2018

Related U.S. Application Data

(63) Continuation of application No. PCT/JP2015/062790, filed on Apr. 28, 2015.

(51) Int. Cl.
  *H04L 25/02* (2006.01)
  *H04W 16/10* (2009.01)
  (Continued)

(52) U.S. Cl.
  CPC ......... *H04W 16/10* (2013.01); *H04L 25/0242* (2013.01); *H04W 24/02* (2013.01);
  (Continued)

(58) Field of Classification Search
  CPC ..... H04W 16/10; H04W 24/02; H04W 24/10; H04W 72/0453; H04W 72/082; H04W 84/12; H04W 88/08; H04L 25/0242
  See application file for complete search history.

(56) References Cited

U.S. PATENT DOCUMENTS

| 6,108,321 A | 8/2000 | Anderson et al. |
| 2008/0132242 A1 | 6/2008 | Hamalainen et al. |

(Continued)

FOREIGN PATENT DOCUMENTS

| JP | 10-79977 A | 3/1998 |
| JP | 2010-119087 A | 5/2010 |

(Continued)

OTHER PUBLICATIONS

Chieochan, S., et. al., "Channel Assignment Schemes for Infrastructure-Based 802.11 WLANs: A Survey," IEEE Comm. Surveys & Tutorials, vol. 12, No. 1, pp. 124-136, 2010.

(Continued)

*Primary Examiner* — Eric Myers
(74) *Attorney, Agent, or Firm* — Arent Fox LLP

(57) ABSTRACT

A channel assignment apparatus includes an interfered amount processing unit that represents a value group by a symmetric matrix, the value group including, as an element, an amount of interference that occurs in each of wireless access points, performs a row exchange and a column exchange in the symmetric matrix based on magnitude of the amount of interference, and generates one of the upper triangular matrix and the lower triangular matrix from the symmetric matrix in which the row exchange and the column exchange are performed, an assigning unit that assigns a frequency channel to each of the wireless access points by using one of the upper triangular matrix and the lower triangular matrix in accordance with a predetermined algorithm for selecting an optimal assignment candidate corresponding to the magnitude of the amount of interference from among a plurality of assignment candidates for the frequency channel.

4 Claims, 10 Drawing Sheets

(51) Int. Cl.
*H04W 24/02* (2009.01)
*H04W 24/10* (2009.01)
*H04W 72/04* (2009.01)
*H04W 72/08* (2009.01)
*H04W 84/12* (2009.01)
*H04W 88/08* (2009.01)

(52) U.S. Cl.
CPC ....... *H04W 24/10* (2013.01); *H04W 72/0453* (2013.01); *H04W 72/082* (2013.01); *H04W 84/12* (2013.01); *H04W 88/08* (2013.01)

(56) References Cited

U.S. PATENT DOCUMENTS

2010/0008316 A1 1/2010 Liu et al.
2013/0070694 A1 3/2013 Tohzaka et al.

FOREIGN PATENT DOCUMENTS

| JP | 2013-066018 A | 4/2013 |
| JP | 2013-081089 A | 5/2013 |
| JP | 2013-093647 A | 5/2013 |

OTHER PUBLICATIONS

International Search Report in related International Application No. PCT/JP2015/062790 dated Jul. 21, 2015.

CHANNEL ASSIGNMENT APPARATUS, WIRELESS COMMUNICATION SYSTEM, AND CHANNEL ASSIGNMENT METHOD

CROSS-REFERENCE TO RELATED APPLICATION

This application is a continuation of International Application No. PCT/JP2015/062790, filed on Apr. 28, 2015, the entire contents of which are incorporated herein by reference.

FIELD

The embodiments discussed herein are related to a channel assignment apparatus, a wireless communication system, and a channel assignment method.

BACKGROUND

In a wireless communication system, such as a wireless local area network (LAN), wireless access points and wireless terminals perform wireless communication by using frequency channels. An arbitrary one of frequency channels available in the wireless communication system is assigned to each of the wireless access points. Hereinafter, a wireless access point may be described as an "AP".

The number of the frequency channels available in the wireless communication system is limited; therefore, if a greater number of APs than the available frequency channels are present in the wireless communication system, in some cases, the same frequency channel may be assigned to a plurality of APs. If the same frequency channel is assigned to a plurality of APs, radio wave interference occurs among the plurality of APs, so that the throughput of the wireless communication system decreases. Furthermore, the radio wave interference among the APs increases or decreases along with a change in the wireless environment. Therefore, to reduce the radio wave interference among the APs, a "dynamic assignment method" has been proposed, in which frequency channels are dynamically assigned to the APs in accordance with a change in the wireless environment. Furthermore, as a technology related to the dynamic assignment method, for example, there is a technology to simultaneously assign frequency channels to all of the APs in the wireless communication system.

Related-art examples are described, for example, in Japanese Laid-open Patent Publication No. 2010-119087, and in Japanese Laid-open Patent Publication No. 10-079977.

In the above-described related technology, it is possible to simultaneously change the frequency channels of all of the APs in accordance with a change in the wireless environment. However, in the above-described related technology, the amount of calculations for assignment of frequency channels (hereinafter, may be referred to as an "assignment calculation amount") exponentially increases in proportion to the number of APs present in a wireless communication system. For example, if C frequency channels are available in an environment in which N APs are installed in a wireless communication system, the number of calculation patterns for the assignment of frequency channels is $C^N$. If the assignment calculation amount exponentially increases as described above, a calculation time for the assignment of frequency channels (hereinafter, may be referred to as an "assignment calculation time") increases. If the assignment calculation time increases, it takes a long time to assign frequency channels after measurement of the wireless environment used as a basis for the assignment of frequency channels; therefore, an actual wireless environment at the time of the assignment of frequency channels may greatly differ from the wireless environment at the time of the measurement. If the actual wireless environment at the time of the assignment of frequency channels greatly differs from the wireless environment at the time of the measurement as described above, it is difficult to assign optimal frequency channels based on the actual wireless environment; therefore, the throughput of the wireless communication system decreases. That is, if the assignment calculation amount increases in assigning frequency channels based on the wireless environment, the throughput of the wireless communication system may decrease in some cases.

SUMMARY

According to an aspect of an embodiment, a channel assignment apparatus includes an interfered amount processing unit that represents a value group by a symmetric matrix, the value group including, as an element, an amount of interference that occurs in each of wireless access points, performs a row exchange and a column exchange in the symmetric matrix based on magnitude of the amount of interference, and generates one of the upper triangular matrix and the lower triangular matrix from the symmetric matrix in which the row exchange and the column exchange are performed, an assigning unit that assigns a frequency channel to each of the wireless access points by using one of the upper triangular matrix and the lower triangular matrix in accordance with a predetermined algorithm for selecting an optimal assignment candidate corresponding to the magnitude of the amount of interference from among a plurality of assignment candidates for the frequency channel.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENTS

Embodiments of a channel assignment apparatus, a wireless communication system, and a channel assignment method disclosed in the present application will be described below based on the drawings. The channel assignment apparatus, the wireless communication system, and the channel assignment method disclosed in the present application are not limited by the embodiments. Furthermore, in the embodiments below, components with the same functions and steps for the same processes are denoted by the same signs, and the same explanation will be omitted.

[a] First Embodiment

<Configuration Example of a Wireless Communication System>

Figure 1:
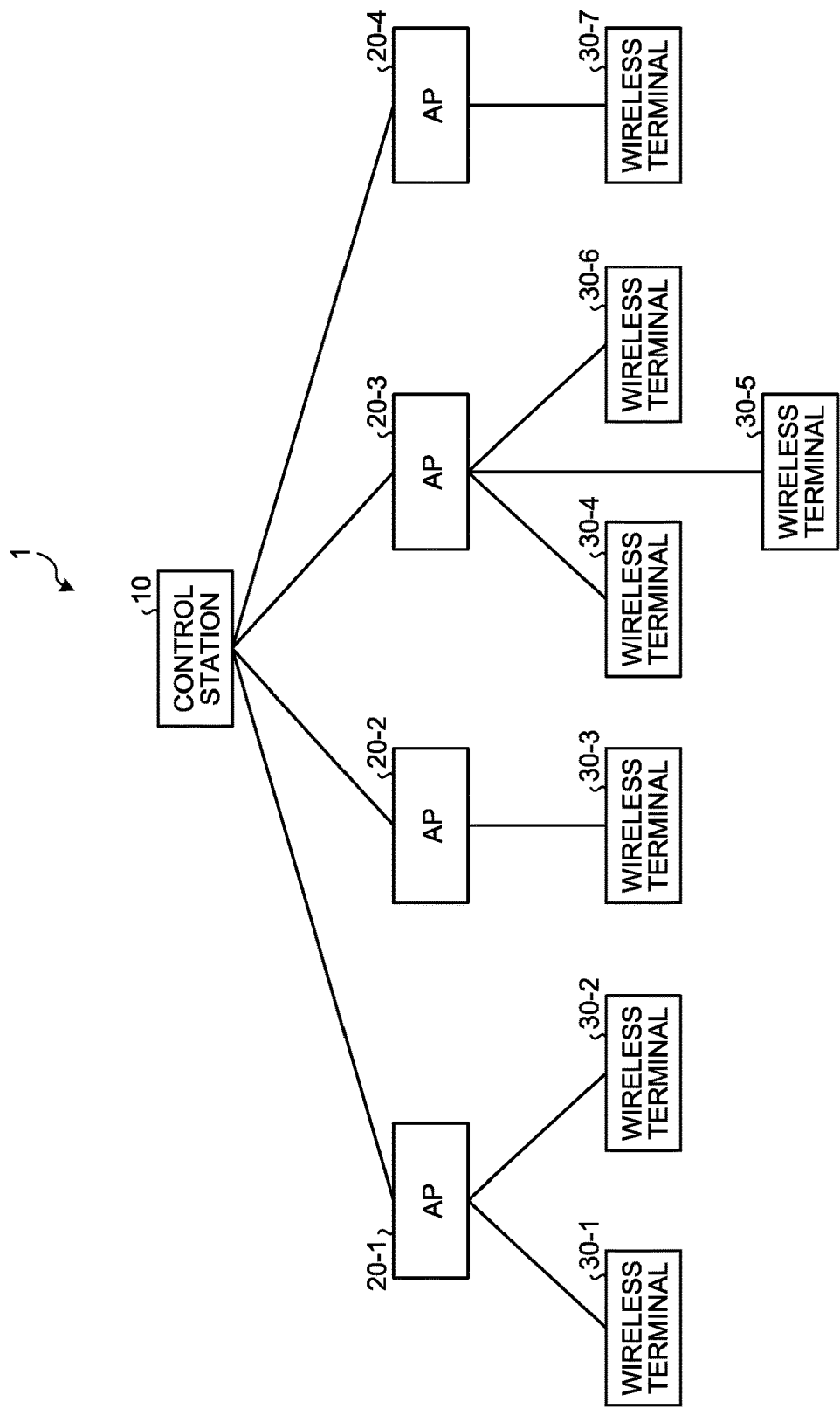
FIG. 1 is a diagram illustrating a configuration example of a wireless communication system of a first embodiment.

FIG. 1 is a diagram illustrating a configuration example of a wireless communication system of a first embodiment. In FIG. 1, a wireless communication system 1 includes a control station 10, APs 20-1 to 20-4, and wireless terminals 30-1 to 30-7. Hereinafter, the APs 20-1 to 20-4 may collectively be referred to as an AP 20 when they are not distinguished from one another, and the wireless terminals 30-1 to 30-7 may collectively be referred to as a wireless terminal 30 when they are not distinguished from one another. Furthermore, the numbers of the APs 20 and the wireless terminals 30 illustrated in FIG. 1 are examples, and the numbers of the APs 20 and the wireless terminals 30 included in the wireless communication system 1 are not specifically limited.

The control station 10 and the AP 20 are connected by a wired link and perform wired communication. The AP 20 and the wireless terminal 30 are connected by a wireless link and perform wireless communication. In the example illustrated in FIG. 1, the AP 20-1 is connected to the wireless terminals 30-1 and 30-2, the AP 20-2 is connected to the wireless terminal 30-3, the AP 20-3 is connected to the wireless terminals 30-4, 30-5, and 30-6, and the AP 20-4 is connected to the wireless terminal 30-7. Furthermore, for example, frequency channels available in the wireless communication system 1 are three frequency channels of 1ch, 6ch, and 11ch, and any of the three frequency channels is assigned to each of the APs 20 by the control station 10. Therefore, for example, the AP 20-1 and the wireless terminals 30-1 and 30-2 perform communication by using 1ch, and the AP 20-2 and the wireless terminal 30-3 perform communication by using 6ch. Moreover, for example, the AP 20-3 and the wireless terminals 30-4, 30-5, and 30-6 perform communication by using 11ch, and the AP 20-4 and the wireless terminal 30-7 perform communication by using 1ch.

In the following, an example will be described in which the frequency channels available in the wireless communication system 1 are the three frequency channels of 1ch, 6ch, and 11ch. Furthermore, in the following, the AP 20-1 may be referred to as a first AP, the AP 20-2 may be referred to as a second AP, the AP 20-3 may be referred to as a third AP, and the AP 20-4 may be referred to as a fourth AP.

<Configuration Example of the Wireless Access Point>

Figure 2:
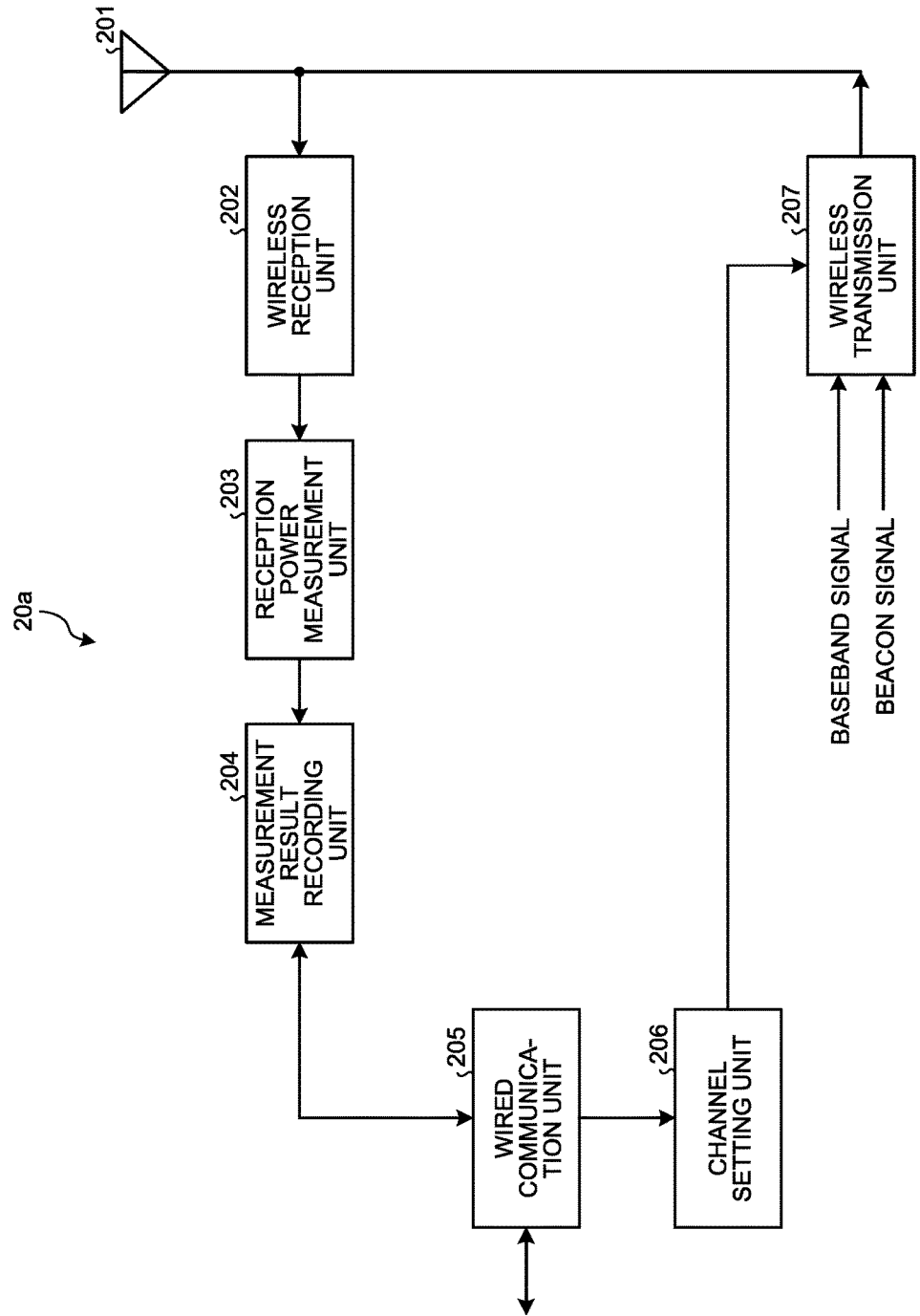
FIG. 2 is a diagram illustrating a configuration example of a wireless access point of the first embodiment.

FIG. 2 is a diagram illustrating a configuration example of the wireless access point of the first embodiment. An AP 20a illustrated in FIG. 2 corresponds to the AP 20 illustrated in FIG. 1. In FIG. 2, the AP 20a includes an antenna 201, a wireless reception unit 202, a reception power measurement unit 203, a measurement result recording unit 204, a wired communication unit 205, a channel setting unit 206, and a wireless transmission unit 207.

The wireless reception unit 202 receives beacon signals transmitted from other APs other than the subject AP via the antenna 201. The wireless reception unit 202 performs a predetermined wireless reception process, such as down-conversion, on the received beacon signals, and outputs the beacon signals subjected to the wireless reception process to the reception power measurement unit 203. The wireless reception unit 202 receives the beacon signals by all of the frequency channels of 1ch, 6ch, and 11ch. Here, the other APs are classified into other APs that belong to the wireless communication system to which the subject AP belongs (hereinafter, may be referred to as a "subject system") and other APs that belong to wireless communication systems other than the subject system (hereinafter, may be referred to as "other systems"). Therefore, in a beacon signal, an identifier capable of uniquely identifying a wireless communication system to which each of the APs belongs (hereinafter, may be referred to as a "system identifier") and an identifier capable of uniquely identifying a transmission source of the beacon signal (hereinafter, may be referred to as an "AP identifier") are added. The wireless reception unit 202 outputs the received beacon signal together with the system identifier and the AP identifier added to the beacon signal to the reception power measurement unit 203.

The reception power measurement unit 203 measures a reception power value of each beacon signal with a constant period, and outputs a measurement result to the measurement result recording unit 204. For example, the reception power measurement unit 203 of the AP 20-1 (FIG. 1) measures reception power values $r_{12}$, $r_{13}$, and $r_{14}$ of beacon signals respectively transmitted from the APs 20-2, 20-3, and 20-4, and an evaluation value $r_{11}$ of a reception power value of a beacon signal transmitted from an AP belonging to the other system. As the evaluation value of the reception power, for example, an average of reception power values over all of the frequency channels available in the wireless communication system may be used. $r_{12}$ represents the reception power value in the AP 20-1 with respect to the beacon signal transmitted from the AP 20-2, $r_{13}$ represents the reception power value in the AP 20-1 with respect to the beacon signal transmitted from the AP 20-3, and $r_{14}$ represents the reception power value in the AP 20-1 with respect to the beacon signal transmitted from the AP 20-4. That is, $r_{12}$ corresponds to an amount of interference in the AP 20-1 caused by the AP 20-2, $r_{13}$ corresponds to an amount of interference in the AP 20-1 caused by the AP 20-3, and $r_{14}$ corresponds to an amount of interference in the AP 20-1 caused by the AP 20-4. In addition, $r_{11}$ corresponds to an amount of interference in the AP 20-1 caused by an AP belonging to the other system.

Furthermore, the reception power measurement unit 203 stores therein a system identifier of the subject system in advance. When a system identifier added to a beacon signal matches the system identifier of the subject system, the reception power measurement unit 203 determines that the beacon signal is transmitted from an AP belonging to the subject system. In contrast, when the system identifier added to the beacon signal does not match the system identifier of the subject system, the reception power measurement unit 203 determines that the beacon signal is transmitted from an AP belonging to the other system. Moreover, the reception power measurement unit 203 identifies the AP serving as a transmission source of the beacon signal based on the AP identifier added to the beacon signal.

The measurement result recording unit 204 records the reception power value and the evaluation value measured by the reception power measurement unit 203. For example, the measurement result recording unit 204 of the AP 20-1 (FIG. 1) records the reception power values $r_{12}, r_{13},$ and $r_{14}$ and the evaluation value $r_{11}$. The reception power value and the evaluation value recorded by the measurement result recording unit 204 are updated by the reception power measurement unit 203 with a constant period.

The wired communication unit 205 is connected to the control station 10 by a wired link, and communicates with the control station 10. The wired communication unit 205 reports the reception power value and the evaluation value recorded in the measurement result recording unit 204 to the control station 10 (FIG. 1) with a constant period. Furthermore, the wired communication unit 205 receives an assignment result for a frequency channel (hereinafter, may be referred to as a "channel assignment result") notified by the control station 10, and outputs the received channel assignment result to the channel setting unit 206.

The channel setting unit 206 sets a transmission channel in the wireless transmission unit 207 to a frequency channel in accordance with the channel assignment result notified by the control station 10. In the channel assignment result, the AP identifier and a frequency channel number are indicated in an associated manner. Therefore, the channel setting unit 206 determines that a frequency channel with the channel number associated with the identifier of the subject AP in the channel assignment result is a frequency channel assigned to the subject AP.

The wireless transmission unit 207 performs a predetermined wireless transmission process, such as up-conversion, on a baseband signal and a beacon signal in accordance with the transmission channel set by the channel setting unit 206, and transmits the signals subjected to the wireless transmission process via the antenna 201. The system identifier of the subject system and the AP identifier of the subject AP are added to the baseband signal and the beacon signal.

<Configuration Example of the Control Station>

Figure 3:
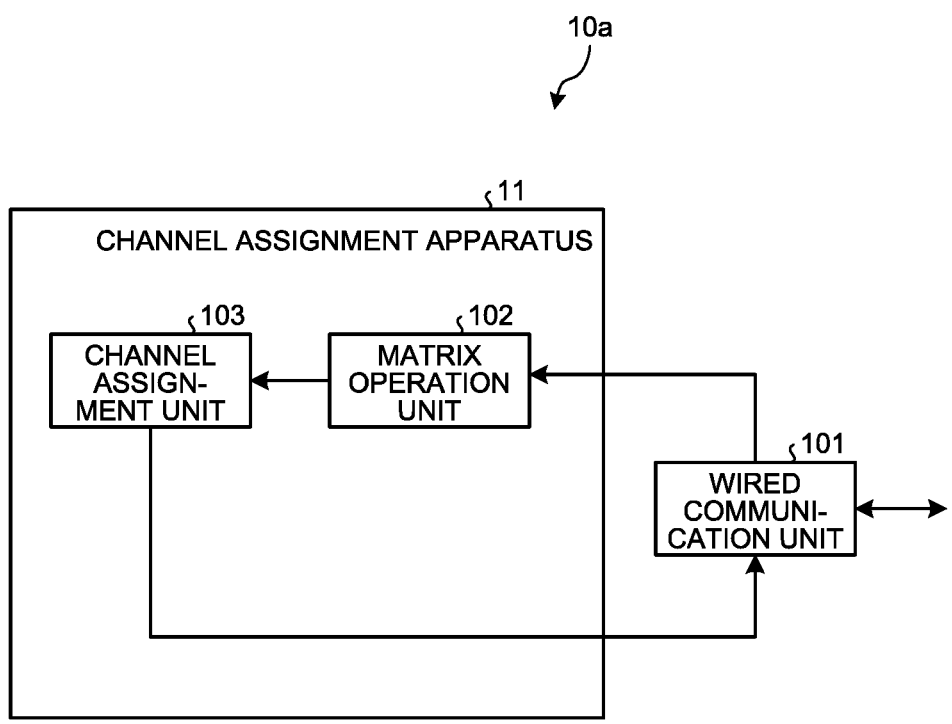
FIG. 3 is a diagram illustrating a configuration example of a control station of the first embodiment.

FIG. 3 is a diagram illustrating a configuration example of the control station of the first embodiment. A control station 10*a* illustrated in FIG. 3 corresponds to the control station 10 illustrated in FIG. 1. In FIG. 3, the control station 10*a* includes a wired communication unit 101 and a channel assignment apparatus 11. The channel assignment apparatus 11 includes a matrix operation unit 102 and a channel assignment unit 103.

The wired communication unit 101 is connected to the AP 20*a* by a wired link, and communicates with the AP 20*a*. The wired communication unit 101 receives the reception power value and the evaluation value reported from the AP 20*a*, and outputs the received reception power value and the received evaluation value to the matrix operation unit 102. Furthermore, the wired communication unit 101 notifies the AP 20*a* of the channel assignment result input from the channel assignment unit 103. The wired communication unit 101 simultaneously notifies all of the APs 20*a* belonging to the subject system of the channel assignment result. By simultaneously notifying all of the APs 20*a* belonging to the subject system of the channel assignment result, all of the APs 20*a* belonging to the subject system can simultaneously change the frequency channels.

The matrix operation unit 102 generates a symmetric matrix that includes, as elements (i.e., components), the reception power values and the evaluation value reported from the AP 20*a*. Furthermore, the matrix operation unit 102 generates an upper triangular matrix from the generated symmetric matrix. Then, the matrix operation unit 102 outputs the generated upper triangular matrix to the channel assignment unit 103. Details of the operations performed by the matrix operation unit 102 will be described later.

The channel assignment unit 103 assigns a frequency channel to the AP 20*a* by using the upper triangular matrix generated by the matrix operation unit 102. Furthermore, after assigning the frequency channel to the AP 20*a*, the channel assignment unit 103 outputs a channel assignment result to the wired communication unit 101. Details of the operations performed by the channel assignment unit 103 will be described later.

<Example of Operations Performed by the Channel Assignment Apparatus>

Figure 4:
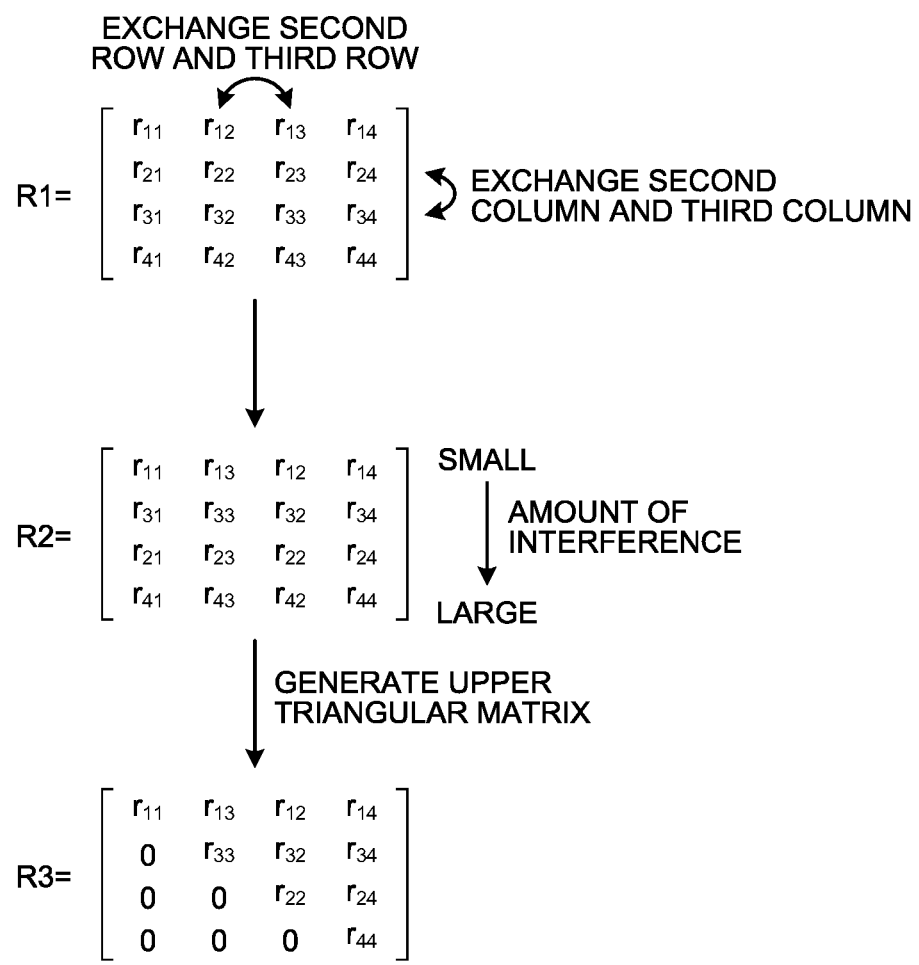
FIG. 4 is a diagram for explaining an example of an operation performed by a channel assignment apparatus of the first embodiment.
Figure 5:
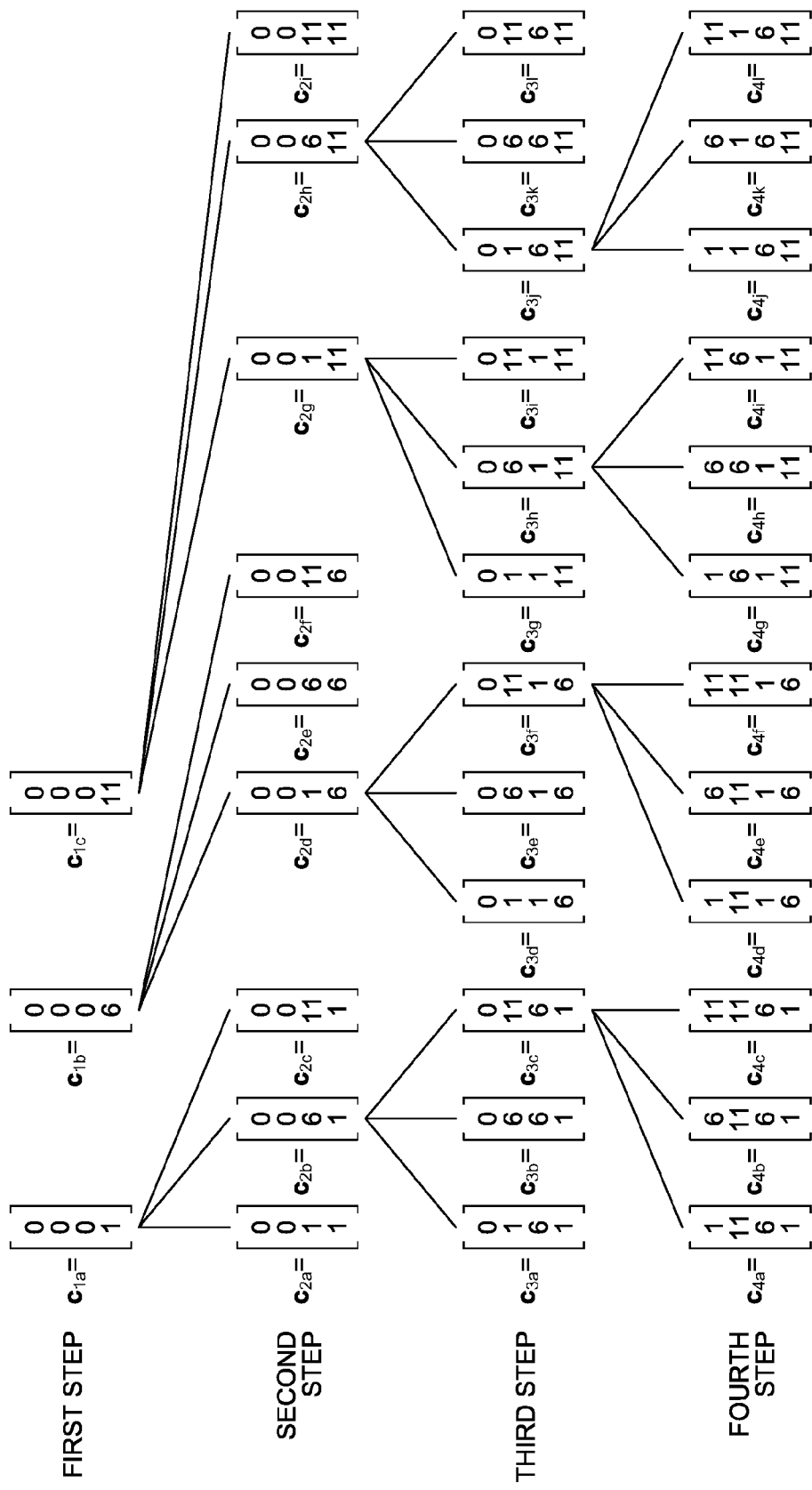
FIG. 5 is a diagram for explaining an example of an operation performed by the channel assignment apparatus of the first embodiment.

FIG. 4 and FIG. 5 are diagrams for explaining examples of operations performed by the channel assignment apparatus of the first embodiment. In the following descriptions, each of the APs 20-1 to 20-4 illustrated in FIG. 1 corresponds to the AP 20*a* illustrated in FIG. 2. Therefore, the AP 20-1 reports, to the control station 10*a*, the reception power value $r_{12}$ in the AP 20-1 with respect to a beacon signal transmitted from the AP 20-2, the reception power value $r_{13}$ in the AP 20-1 with respect to a beacon signal transmitted from the AP 20-3, the reception power value $r_{14}$ in the AP 20-1 with respect to a beacon signal transmitted from the AP 20-4, and the evaluation value $r_{11}$ of a reception power value in the AP 20-1 with respect to a beacon signal transmitted from an AP belonging to the other system. Furthermore, the AP 20-2 reports, to the control station 10*a*, a reception power value $r_{21}$ in the AP 20-2 with respect to a beacon signal transmitted from the AP 20-1, a reception power value $r_{23}$ in the AP 20-2 with respect to a beacon signal transmitted from the AP 20-3, a reception power value $r_{24}$ in the AP 20-2 with respect to a beacon signal transmitted from the AP 20-4, and an evaluation value $r_{22}$ of a reception power value in the AP 20-2 with respect to a beacon signal transmitted from an AP belonging to the other system. Moreover, the AP 20-3 reports, to the control station 10*a*, a reception power value $r_{31}$ in the AP 20-3 with respect to a beacon signal transmitted from the AP 20-1, a reception power value $r_{32}$ in the AP 20-3 with respect to a beacon signal transmitted from the AP 20-2, a reception power value $r_{34}$ in the AP 20-3 with respect to a beacon signal transmitted from the AP 20-4, and an evaluation value $r_{33}$ of a reception power value in the AP 20-3 with respect to a beacon signal transmitted from an AP belonging to the other system. Furthermore, the AP 20-4 reports, to the control station 10*a*, a reception power value $r_{41}$ in the AP 20-4 with respect to a beacon signal transmitted from the AP 20-1, a reception power value $r_{42}$ in the AP 20-4 with respect to a beacon signal transmitted from the AP 20-2, a reception power value $r_{43}$ in the AP 20-4 with respect to a beacon signal transmitted from the AP 20-3, and an evaluation value $r_{44}$ of a reception power value in the AP 20-4 with respect to a beacon signal transmitted from an AP belonging to the other system. The reception power values and the evaluation values reported from the APs 20-1 to 20-4 correspond to the amounts of interference in each of the APs caused by the other APs as described above.

In the channel assignment apparatus 11 (FIG. 3), the matrix operation unit 102 first generates a matrix R1 that includes, as elements, the reception power values reported from the APs 20-1 to 20-4 as illustrated in FIG. 4. Here, it is assumed that transmission power values of the APs 20-1 to 20-4 are equal to one another, and propagation channels between APs are symmetric for the APs 20-1 to 20-4. Therefore, the matrix R1 is a symmetric matrix. That is, in the matrix R1, $r_{12}$ and $r_{21}$ are equal to each other, $r_{13}$ and $r_{31}$ are equal to each other, $r_{14}$ and $r_{41}$ are equal to each other, $r_{23}$ and $r_{32}$ are equal to each other, $r_{24}$ and $r_{42}$ are equal to each other, and $r_{34}$ and $r_{43}$ are equal to each other. The matrix operation unit 102 performs a process as described below on each of the elements of the symmetric matrix based on the symmetric property of propagation channels between the APs.

Specifically, the matrix operation unit 102 performs row exchange and column exchange in the matrix R1. The row exchange is performed based on a sum S of elements in each row of the matrix R1 (that is, the sum of the amounts of interference for each of the APs 20). Here, the sum of the amounts of interference in the AP 20-1 is obtained such that $S_1=r_{11}+r_{12}+r_{13}+r_{14}$, and the sum of the amounts of interference in the AP 20-2 is obtained such that $S_2=r_{21}+r_{22}+r_{23}+r_{24}$. Furthermore, the sum of the amounts of interference in the AP 20-3 is obtained such that $S_3=r_{31}+r_{32}+r_{33}+r_{34}$, and the sum of the amounts of interference in the AP 20-4 is obtained such that $S_4=r_{41}+r_{42}+r_{43}+r_{44}$. Here, for example, it is assumed that "$S_1<S_3<S_2<S_4$". Therefore, the matrix operation unit 102 exchanges the second row and the third row in the matrix R1 such that the sum of the amounts of interference increases with an increase in the row number. Subsequently, the matrix operation unit 102 exchanges columns in accordance with the row exchange. That is, the matrix operation unit 102 exchanges the second column and the third column after exchanging the second row and the third row in the matrix R1.

Consequently, a matrix R2 is obtained as a matrix in which the row exchange and the column exchange are performed. In the matrix R2, the sum of the amounts of interference increases in order of $S_1$ in the first row, $S_3$ in the second row, $S_2$ in the third row, and $S_4$ in the fourth row. That is, in the matrix R2, the sum of the amounts of interference in each of the APs 20 increases with an increase in the row number. Furthermore, because the column exchange is performed in accordance with the row exchange, a physical situation represented by the matrix R2 is equal to a physical situation represented by the matrix R1. Therefore, the matrix R2 is a symmetric matrix similarly to the matrix R1.

Subsequently, because the matrix R2 is a symmetric matrix, the matrix operation unit 102 generates an upper triangular matrix R3 by replacing all of the elements below the on-diagonal elements (i.e., lower triangular elements) of the matrix R2 with zero. The matrix operation unit 102 outputs the generated upper triangular matrix R3 to the channel assignment unit 103.

The channel assignment unit 103 assigns a frequency channel to each of the APs 20-1 to 20-4 by using the upper triangular matrix R3. The frequency channel is assigned in accordance with a predetermined algorithm. As the predetermined algorithm, for example, an algorithm for selecting an optimal assignment candidate corresponding to the magnitude of the amount of interference from among a plurality of assignment candidates for a frequency channel is used. In the following, a case will be described in which an M algorithm is used as the predetermined algorithm, for example. Furthermore, in the following, the number M of selection candidates at each step is set such that M=4, for example. Moreover, in the following, the assignment candidates for a frequency channel are selected by using a candidate vector c represented by Expression (1). The candidate vector c is a column vector with N rows and one column (N is the total number of APs belonging to the subject system), where an i-th element of the candidate vector c represents the channel number of an assignment candidate set for an i-th AP.

Therefore, for example, in the candidate vector c, a fourth element $c_4$ represents the channel number of an assignment candidate set for the AP 20-4 with the sum $S_4$ of the amounts of interference, and a third element $c_3$ represents the channel number of an assignment candidate set for the AP 20-2 with the sum $S_2$ of the amounts of interference. Furthermore, a second element $c_2$ represents the channel number of an assignment candidate set for the AP 20-3 with the sum $S_3$ of the amounts of interference, and a first element $c_1$ represents the channel number of an assignment candidate set for the AP 20-1 with the sum $S_1$ of the amounts of interference. As described above, "$S_1<S_3<S_2<S_4$".

$$c = \begin{bmatrix} c_1 \\ c_2 \\ c_3 \\ c_4 \end{bmatrix} \quad (1)$$

As illustrated in FIG. 5, the channel assignment unit 103 adds assignment candidates for a frequency channel for each of the APs at each of four steps k=1 to 4. Furthermore, the channel assignment unit 103 sets the assignment candidates for a frequency channel in order from the AP with the greatest sum of the amounts of interference.

Specifically, the channel assignment unit 103 first generates three candidate vectors $c_{1a}$, $c_{1b}$, and $c_{1c}$ at the first step because the frequency channels available in the subject system are the three channels of 1ch, 6ch, and 11ch. The values 1, 6, and 11 in the candidate vectors indicate the channel numbers of 1ch, 6ch, and 11ch, respectively. Furthermore, a value of 0 in the candidate vectors indicates that the assignment candidate for a frequency channel is not yet set. The channel assignment unit 103 calculates a metric $I_k$ at the k-th step for each of the candidate vectors $c_{1a}$, $c_{1b}$, and $c_{1c}$ in accordance with Expression (2).

$$I_k = \sum_{i \leq j \text{ and } i,j > (N-k)} d_{ij} r_{ij} \quad (2)$$

$d_{ij} = 1$ when i-th AP and j-th AP use same frequency channel $d_{ij} = 0$ other than above condition Therefore, at the first step in FIG. 5, all of a metric $I_{1a}$ with respect to $c_{1a}$, a metric $I_{1b}$ with respect to $c_{1b}$, and a metric $I_{1c}$ with respect to $c_{1c}$ equally become $r_{44}$. Furthermore, M=4. Therefore, the channel assignment unit 103 selects all of the three candidate vectors $c_{1a}$, $c_{1b}$, and $c_{1a}$, and proceeds to the second step in FIG. 5. In the following, the subscript of the candidate vector c and the subscript of the metric I have one-to-one correspondence.

Subsequently, at the second step, the channel assignment unit 103 generates nine candidate vectors $c_{2a}$ to $c_{2i}$, and calculates a metric $I_k$ for each of the candidate vectors $c_{2a}$ to $c_{2i}$ in accordance with Expression (2). Consequently, metrics $I_{2a}$, $I_{2e}$, and $I_{2i}$ equally become "$r_{44}+r_{33}+r_{34}$" and metrics $I_{2b}$, $I_{2c}$, $I_{2d}$, $I_{2f}$, $I_{2g}$, and $I_{2h}$ equally become "$r_{44}+r_{33}$". Therefore, the minimum metric at the second step is "$r_{44}+r_{33}$". Furthermore, M=4. Therefore, the channel assignment unit 103 selects four candidate vectors from among the candidate vectors $c_{2b}$, $c_{2c}$, $c_{2d}$, $c_{2f}$, $c_{2g}$, and $c_{2h}$ in accordance with a predetermined rule or in random order, and proceeds to the third step in FIG. 5. Here, it is assumed that the four candidate vectors $c_{2b}$, $c_{2d}$, $c_{2g}$, and $c_{2h}$ are selected.

Subsequently, at the third step, the channel assignment unit 103 generates 12 candidate vectors $c_{3a}$ to $c_{3l}$, and calculates a metric $I_k$ for each of the candidate vectors $c_{3a}$ to $c_{3l}$ in accordance with Expression (2). Consequently, metrics $I_{3a}$, $I_{3e}$, $I_{3i}$, and $I_{3l}$ equally become "$r_{44}+r_{33}+r_{22}+r_{24}$", metrics $I_{3b}$, $I_{3d}$, $I_{3g}$, and $I_{3k}$ equally become "$r_{44}+r_{33}+r_{22}+r_{23}$", and metrics $I_{3c}$, $I_{3f}$, $I_{3h}$, and $I_{3j}$ equally become "$r_{44}+r_{33}+r_{22}$". Therefore, the minimum metric at the third step is "$r_{44}+r_{33}+r_{22}$". Furthermore, M=4. Therefore, the channel assignment unit 103 selects the four candidate vectors $c_{3c}$, $c_{3f}$, $c_{3h}$, and $c_{3j}$ from among the candidate vectors $c_{3a}$ to $c_{3l}$, and proceeds to the fourth step in FIG. 5.

Subsequently, at the fourth step, the channel assignment unit 103 generates 12 candidate vectors $c_{4a}$ to $c_{4l}$, and calculates a metric $I_k$ for each of the candidate vectors $c_{4a}$ to $c_{4l}$ in accordance with Expression (2). Consequently, metrics $I_{4a}$, $I_{4e}$, $I_{4i}$, and $I_{4l}$ equally become "$r_{44}+r_{33}+r_{22}+r_{11}+r_{14}$", metrics $I_{4b}$, $I_{4d}$, $I_{4g}$, and $I_{4k}$ equally become "$r_{44}+r_{33}+r_{22}+r_{11}+r_{13}$", and metrics $I_{4c}$, $I_{4f}$, $I_{4h}$, and $I_{4j}$ equally become "$r_{44}+r_{33}+r_{22}+r_{11}+r_{12}$". The channel assignment unit 103 selects the minimum metric from among "$r_{44}+r_{33}+r_{22}+r_{11}+r_{14}$", "$r_{44}+r_{33}+r_{22}+r_{11}+r_{13}$", and "$r_{44}+r_{33}+r_{22}+r_{11}+r_{12}$". Then, the channel assignment unit 103 determines a candidate vector with the minimum metric as an assignment result for a frequency channel. If there are a plurality of candidate vectors with the minimum metric, any one of the candidate vectors may be selected in accordance with a predetermined rule or in random order. For example, if "$r_{44}+r_{33}+r_{22}+r_{11}+r_{14}$" is the minimum metric, the channel assignment unit 103 determines the candidate vector $c_{4a}$ as the assignment result for a frequency channel. When determining the candidate vector $c_{4a}$ as the assignment result for a frequency channel, the channel assignment unit 103 assigns 1ch to the AP 20-4, 6ch to the AP 20-2, 11ch to the AP 20-3, and 1ch to the AP 20-1.

Here, the metrics calculated at each of the first to the fourth steps correspond to the sums of the amounts of interference that occurs in each of the APs when the frequency channels indicated by the candidate vectors are assigned to each of the APs. Therefore, selecting a candidate vector with the minimum metric at each of the first to the fourth steps is equal to selecting an assignment candidate for a frequency channel with which the sum of the amounts of interference in each of the APs is minimized. Furthermore, the throughput of the wireless communication system can be increased by decreasing the amounts of interference in each of the APs. Therefore, selecting the assignment candidate for a frequency channel with which the sum of the amounts of interference in each of the APs is minimized means selecting an optimal assignment candidate for a frequency channel.

Furthermore, if the number of selection candidates at each of the steps is denoted by M and the total number of the steps is denoted by N (N is the total number of APs belonging to the subject system), calculation man-hours for the assignment of frequency channels corresponds to order of about MN. Moreover, it is preferable to set the number M of the selection candidates at each of the steps such that M=CN (C is the number of frequency channels available in the subject system). Therefore, in the operation example as described above, it is possible to suppress the calculation man-hours for the assignment of frequency channels to order of about $N^2$.

<Example of a Process Performed by the Channel Assignment Apparatus>

Figure 6:
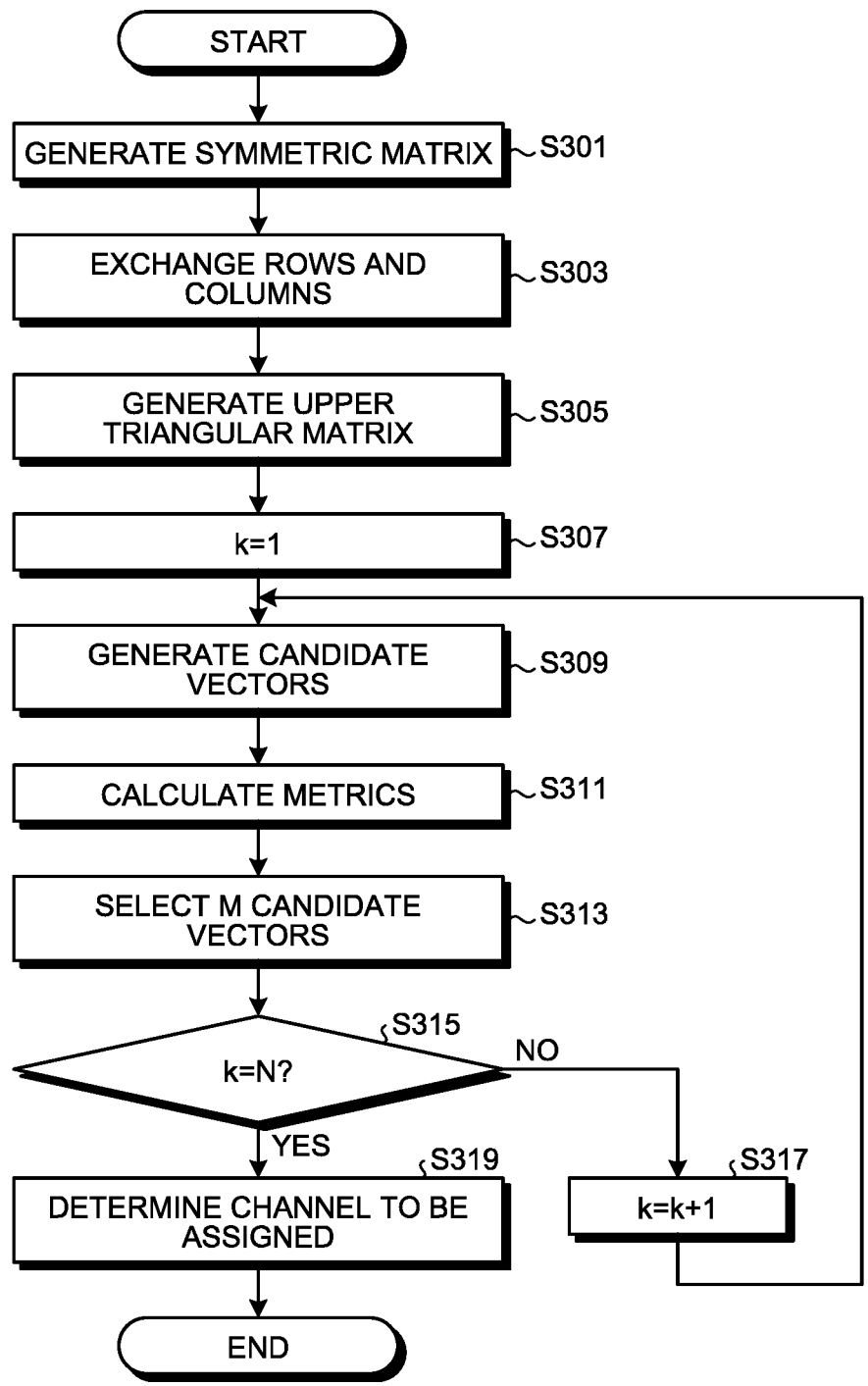
FIG. 6 is a flowchart for explaining an example of a process performed by the channel assignment apparatus of the first embodiment.

FIG. 6 is a flowchart for explaining an example of a process performed by the channel assignment apparatus of the first embodiment. The flowchart illustrated in FIG. 6 starts when, for example, a reception power value and an evaluation value of a beacon signal in each of the APs 20 are input from the wired communication unit 101 to the channel assignment apparatus 11.

In FIG. 6, at Step S301, the matrix operation unit 102 generates a symmetric matrix R with N rows and N columns represented by Expression (3). In Expression (3), N represents the total number of APs belonging to the subject system.

$$R = [r_{ij}]_{N \times N} \quad (3)$$

$$r_{ij} = \begin{pmatrix} \text{reception power value in } i\text{-th } AP \\ \text{with respect to beacon signal transmitted} \\ \text{from } j\text{-th } AP \text{ belonging to subject system} \end{pmatrix} \text{ for } i \ne j$$

$$r_{ii} = \begin{pmatrix} \text{evaluation value of reception power value in } i\text{-th } AP \\ \text{with respect to beacon signal transmitted} \\ \text{from } AP \text{ belonging to other system} \end{pmatrix}$$

Subsequently, at Step S303, the matrix operation unit 102 performs row exchange and column exchange in the symmetric matrix R represented by Expression (3). The matrix operation unit 102 exchanges rows with each other such that a value $S_i$ of the sum of each row i represented by Expression (4) increases with an increase in the row number. That is, the matrix operation unit 102 exchanges rows with each other such that $S_i$ is arranged in an ascending order starting from the first row in the symmetric matrix R. Furthermore, after exchanging the rows, the matrix operation unit 102 exchanges columns having the same numbers as the exchanged rows.

$$S_i = \sum_{k=1}^{N} r_{ik} \quad (4)$$

Subsequently, at Step S305, the matrix operation unit 102 generates an upper triangular matrix by replacing lower triangular elements $r_{ij}$ (i>j) with zero in the symmetric matrix in which the rows and the columns are exchanged.

Subsequently, at Step S307, the channel assignment unit 103 sets k to 1.

Subsequently, at Step S309, the channel assignment unit 103 generates candidate vectors c.

Subsequently, at Step S311, the channel assignment unit 103 calculates a metric I for each of the candidate vectors c by using the upper triangular matrix generated at Step S305.

Subsequently, at Step S313, the channel assignment unit 103 selects M candidate vectors in order from the smallest metric.

Subsequently, at Step S315, the channel assignment unit 103 determines whether k is N. If k is not N (NO at Step S315), the process proceeds to Step S317. If k is N (YES at Step S315), the process proceeds to Step S319.

At Step S317, the channel assignment unit 103 increments k. After k is incremented, the process returns to Step S309.

At Step S319, the channel assignment unit 103 determines a candidate vector having the minimum metric as an assignment result for a frequency channel. That is, the channel assignment unit 103 determines a frequency channel to be assigned to each of the APs. After the process at Step S319, the process ends.

As described above, the channel assignment apparatus of the first embodiment includes the matrix operation unit 102 and the channel assignment unit 103. The matrix operation unit 102 generates an upper triangular matrix from a symmetric matrix that includes, as elements, the amounts of interference in each of the APs 20-1 to 20-4 caused by other APs. The channel assignment unit 103 assigns a frequency channel to each of the APs 20-1 to 20-4 by using the upper triangular matrix generated by the matrix operation unit 102.

With this operation, in calculations to assign a frequency channel, calculations of the lower triangular elements in the symmetric matrix are omitted, so that the amount of calculations for the assignment of frequency channels is reduced. Therefore, a time lag between the measurement of the amounts of interference and the assignment of frequency channels is reduced, so that a difference between the actual amounts of interference at the time of the assignment of frequency channels and the amounts of interference at the time of the measurement can be reduced. Consequently, according to the first embodiment, it is possible to improve the throughput of the wireless communication system.

Furthermore, in the first embodiment, the matrix operation unit 102 performs row exchange and column exchange in the symmetric matrix based on the magnitudes of the amounts of interference, and generates an upper triangular matrix from the symmetric matrix in which the row exchange and the column exchange are performed. The channel assignment unit 103 assigns a frequency channel to each of the APs 20-1 to 20-4 by using the upper triangular matrix generated by the matrix operation unit 102, in accordance with a predetermined algorithm for selecting an optimal assignment candidate corresponding to the magnitude of the amount of interference from among a plurality of assignment candidates for a frequency channel.

With this operation, a frequency channel is preferentially assigned to an AP with a greater amount of interference; therefore, it becomes possible to assign a frequency channel that minimizes radio wave interference between APs, with a reduced calculation amount and at an increased speed.

[b] Second Embodiment

In the first embodiment, an explanation has been given based on the assumption that the transmission power values of the APs 20-1 to 20-4 are equal to one another. In contrast, in a second embodiment, a case will be described in which the transmission power values of the APs 20-1 to 20-4 are different from one another.

<Configuration Example of a Control Station>

Figure 7:
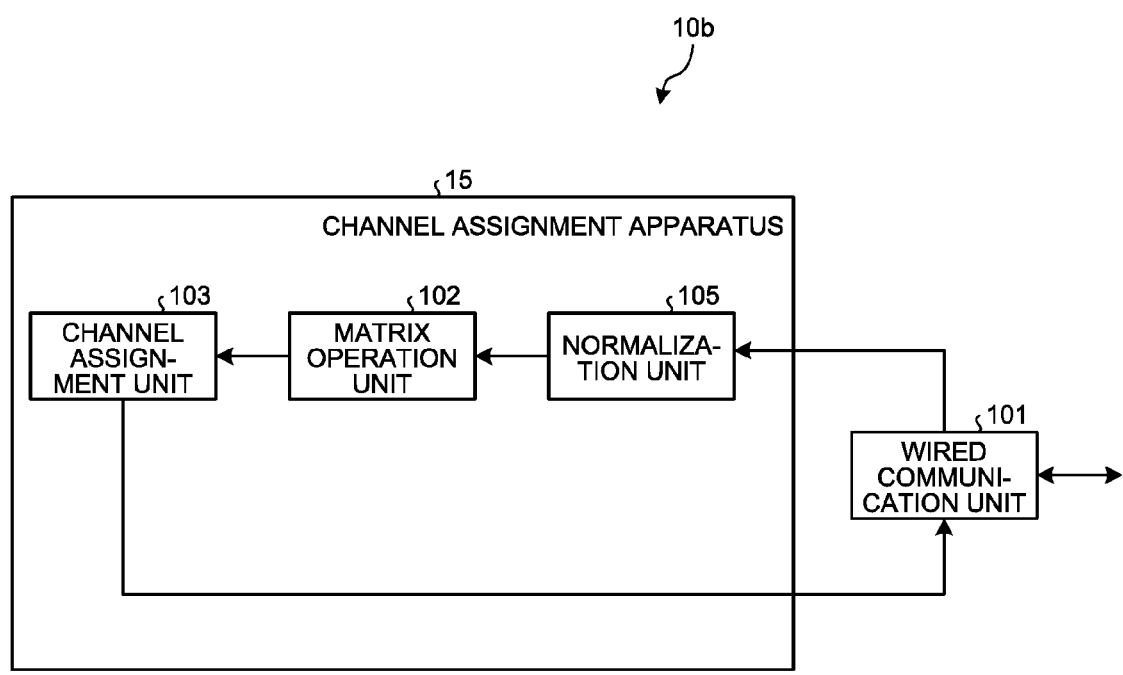
FIG. 7 is a diagram illustrating a configuration example of a control station of a second embodiment.

FIG. 7 is a diagram illustrating a configuration example of a control station of the second embodiment. A control station 10b illustrated in FIG. 7 corresponds to the control station 10 illustrated in FIG. 1. In FIG. 7, the control station 10b includes the wired communication unit 101 and a channel assignment apparatus 15. The channel assignment apparatus 15 includes a normalization unit 105, the matrix operation unit 102, and the channel assignment unit 103. In the following, a difference from the first embodiment will be described.

The wired communication unit 101 receives reception power values and evaluation values reported from the APs 20a, and outputs the received reception power values and the received evaluation values to the normalization unit 105.

The normalization unit 105 normalizes the reception power values and the evaluation values reported from the APs 20a based on the transmission power value of each of the APs 20a. For example, the normalization unit 105 normalizes reception power values and evaluation values $r_{ij}$ reported from the APs 20a in accordance with Expression (5) and Expression (6). In Expression (6), $p_k$ represents a transmission power value of a k-th AP, and p represents a reference transmission power value. The normalization unit 105 knows the transmission power value $p_k$ in advance by receiving a report from the k-th AP. Furthermore, for example, it is preferable to set the reference transmission power value p to an average of the transmission power values of all of the APs belonging to the subject system. Then, the normalization unit 105 outputs normalized reception power values and normalized evaluation values $r_{ij}'$ to the matrix operation unit 102.

$$r_{ik}' = (t_{ik})^{-1} r_{ik}, \; t_{ik} = \begin{pmatrix} \text{constant set by transmission} \\ \text{power value of } k\text{-th AP} \end{pmatrix}, i = 1, \ldots, N \quad (5)$$

$$t_{ik} = p_k / p \quad (6)$$

The matrix operation unit 102 generates a symmetric matrix that includes, as elements, the normalized reception power values and the normalized evaluation values $r_{ij}'$, instead of the reception power values and the evaluation values $r_{ij}$ in the first embodiment. The subsequent processes performed by the matrix operation unit 102 and the channel assignment unit 103 are the same as those of the first embodiment.

As described above, the channel assignment apparatus of the second embodiment further includes the normalization unit 105. The normalization unit 105 normalizes the amounts of interference in each of the APs 20-1 to 20-4 caused by the other APs based on the transmission power values of the other APs. The matrix operation unit 102 generates an upper triangular matrix from the symmetric matrix that includes the normalized amounts of interference as elements.

With this operation, even when the transmission power values of the respective APs are different from one another, it is possible to obtain a symmetric matrix that includes the amounts of interference as elements. Therefore, even when the transmission power values of the respective APs are different from one another, calculations for the lower triangular elements in the symmetric matrix are omitted, so that it is possible to reduce a calculation amount for assignment of frequency channels.

[c] Third Embodiment

In the first embodiment, a case has been described in which the channel assignment apparatus is mounted in the control station 10. In contrast, in a third embodiment, a case will be described in which the channel assignment apparatus is mounted in a representative AP among a plurality of the APs 20.

<Configuration Example of a Wireless Communication System>

Figure 8:
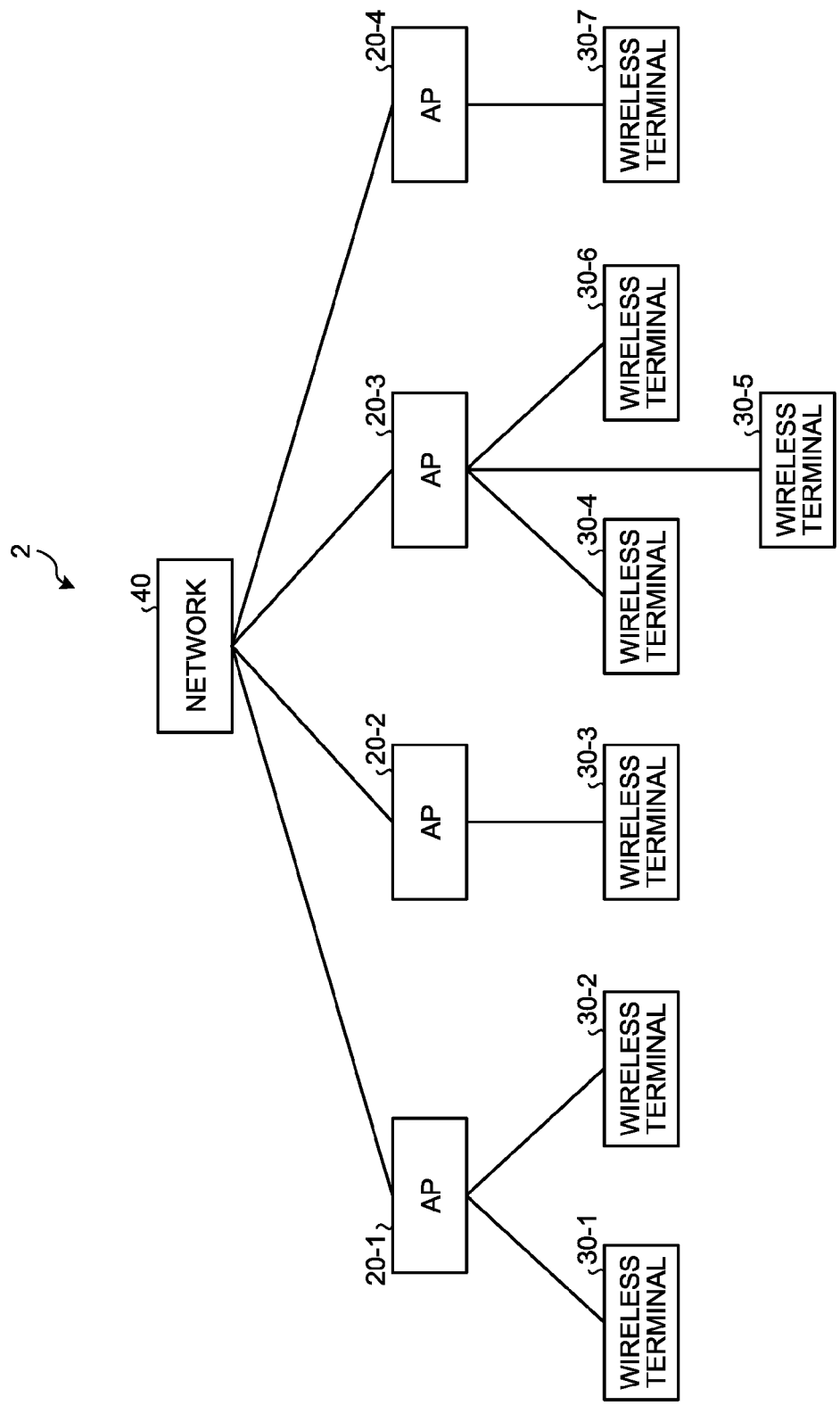
FIG. 8 is a diagram illustrating a configuration example of a wireless communication system of a third embodiment.

FIG. 8 is a diagram illustrating a configuration example of a wireless communication system of the third embodiment. In FIG. 3, a wireless communication system 2 includes a network 40, the APs 20-1 to 20-4, and the wireless terminals 30-1 to 30-7. The APs 20-1 to 20-4 are connected to one another via the network 40, and can communicate with one another. In the following, as one example, a case will be described in which the AP 20-1 among the APs 20-1 to 20-4 serves as a representative AP in which the channel assignment apparatus is mounted.

<Configuration Example of the Wireless Access Point>

Figure 9:
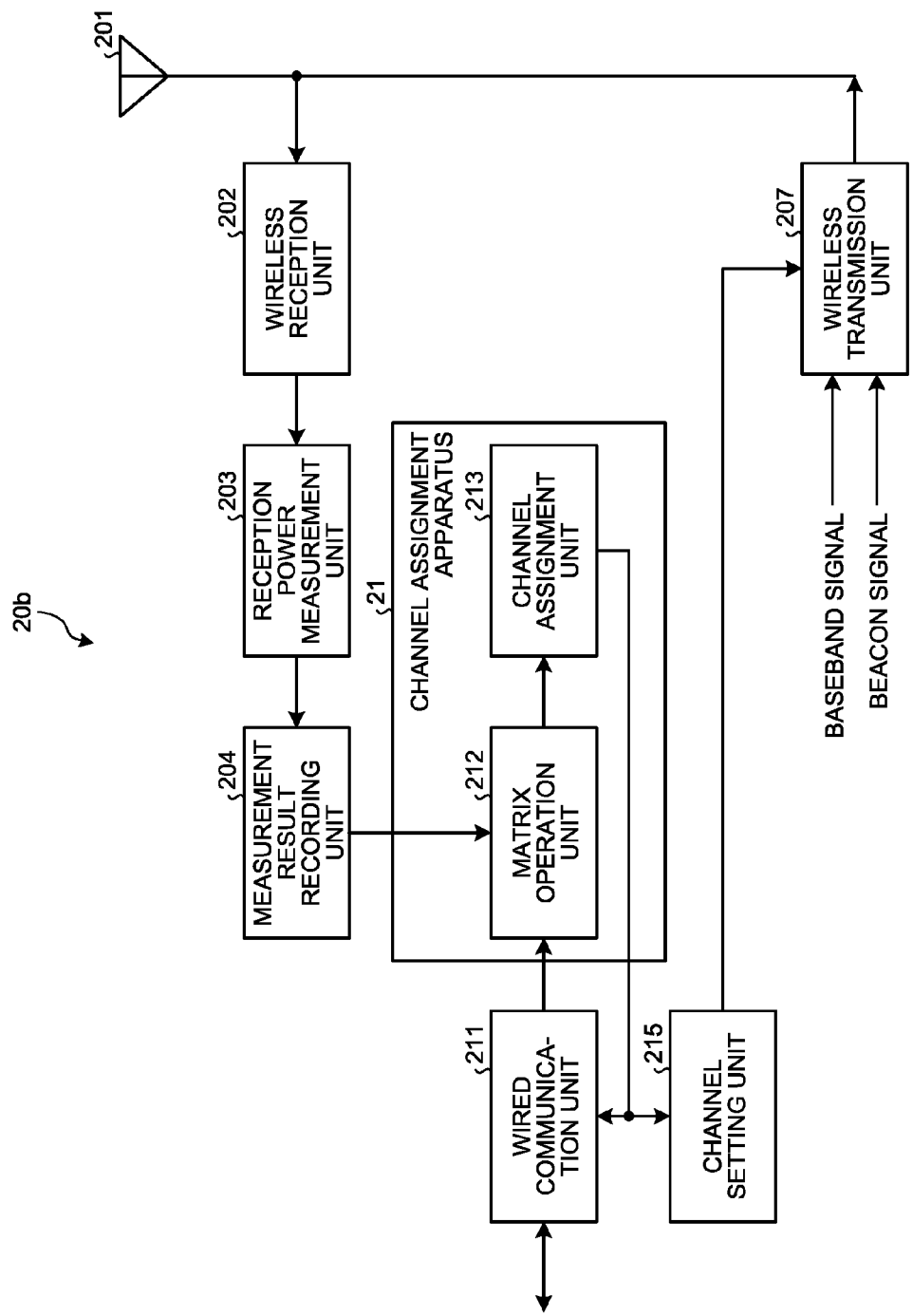
FIG. 9 is a diagram illustrating a configuration example of a wireless access point of the third embodiment.

FIG. 9 is a diagram illustrating a configuration example of the wireless access point of the third embodiment. An AP 20b illustrated in FIG. 9 corresponds to the representative AP 20-1 illustrated in FIG. 8.

A configuration example of the APs 20-2 to 20-4 other than the representative AP 20-1 is the same as the configuration example illustrated in FIG. 2, where the wired communication unit 205 of each of the APs 20-2 to 20-4 is connected to the representative AP 20-1 by a wired link via the network 40 and communicates with the representative AP 20-1. The wired communication unit 205 reports the reception power value and the evaluation value recorded in the measurement result recording unit 204 to the representative AP 20-1 with a constant period. Furthermore, the wired communication unit 205 receives a channel assignment result notified by the representative AP 20-1, and outputs the received channel assignment result to the channel setting unit 206.

In FIG. 9, the AP 20b includes the antenna 201, the wireless reception unit 202, the reception power measurement unit 203, the measurement result recording unit 204, a wired communication unit 211, a channel setting unit 215, the wireless transmission unit 207, and a channel assignment apparatus 21. The channel assignment apparatus 21 includes a matrix operation unit 212 and a channel assignment unit 213.

The matrix operation unit 212 generates a symmetric matrix that includes, as elements, the reception power values and the evaluation values $r_{21}$, $r_{22}$, $r_{23}$, $r_{24}$, $r_{31}$, $r_{32}$, $r_{33}$, $r_{34}$, $r_{41}$, $r_{42}$, $r_{43}$, and $r_{44}$ reported from the APs 20-2 to 20-4 and the reception power values and the evaluation value $r_{11}$, $r_{12}$, $r_{13}$, and $r_{14}$ recorded in the measurement result recording unit 204. Furthermore, the matrix operation unit 212 generates an upper triangular matrix from the generated symmetric matrix. Then, the matrix operation unit 212 outputs the generated upper triangular matrix to the channel assignment unit 213. The operations performed by the matrix operation unit 212 are the same as the operations performed by the matrix operation unit 102 of the first embodiment (FIG. 3).

The operations performed by the channel assignment unit 213 are the same as the operations performed by the channel assignment unit 103 of the first embodiment (FIG. 3). However, the channel assignment unit 213 outputs a channel assignment result to the wired communication unit 211 and the channel setting unit 215.

The channel setting unit 215 sets the transmission channel in the wireless transmission unit 207 to the frequency channel in accordance with the channel assignment result input from the channel assignment unit 213.

As described above, in the third embodiment, an AP includes the channel assignment apparatus.

With this configuration, it is possible to increase variations of a mode of installation of the channel assignment apparatus.

[d] Other Embodiments

[1] It is possible to apply the second embodiment to the third embodiment.

[2] In the first embodiment, as one example of the evaluation value of the reception power value of a beacon signal transmitted from an AP belonging to the other system, an average of the reception power values over all of the frequency channels available in the wireless communication system is used. In contrast, it may be possible to use, as the evaluation value, an expectation value of the reception power value of a beacon signal transmitted from an AP belonging to the other system in a time direction. Specifically, in each of the APs, assuming that a time for receiving a beacon signal transmitted from an AP belonging to the other system in a predetermined measurement period of T seconds is represented by t seconds, a reception hour rate is defined as t/T. It may be possible to assign a weight to the reception power value of the beacon signal transmitted from the AP belonging to the other system in accordance with the reception time rate t/T, and use the weighted reception power value as the evaluation value.

[3] In the above-described embodiments, the amount of interference in each of the APs is measured based on the reception power value in each of the APs. In contrast, it may be possible to measure the amount of interference in each of the APs based on the reception power value in each of the APs, the number of wireless terminals connected to each of the APs, and a traffic volume of uplink or downlink in each of the APs. Alternatively, it may be possible to measure the amount of interference in each of the APs based on the reception power value in each of the APs and the transmission power value in each of the APs. Furthermore, it may be possible to measure the amount of interference caused by an AP belonging to the other system for each of the frequency channels available in the subject system.

[4] In the above-described embodiments, a frequency channel is assigned by using the upper triangular matrix generated from the symmetric matrix. In contrast, it may be possible to generate a lower triangular matrix from the symmetric matrix, and assign a frequency channel by using the lower triangular matrix. When the frequency channel is assigned by using the lower triangular matrix, the following points are different from the case in which the frequency channel is assigned by using the upper triangular matrix. That is, row exchange is performed in the symmetric matrix such that the sum of the amounts of interference decreases with an increase in the row number. Furthermore, the lower triangular matrix is generated by replacing all of the elements above the on-diagonal elements (i.e., upper triangular elements) with zero in the symmetric matrix in which rows and columns are exchanged. Moreover, a metric $I_k$ at the k step is calculated in accordance with Expression (7).

$$I_k = \sum_{i \geq j \text{ and } i,j \leq k} d_{ij} r_{ij} \tag{7}$$

$d_{ij} = 1$ when $i$-th AP and $j$-th AP use same frequency channel $d_{ij} = 0$ other than above condition

[5] In the above-described embodiments, a frequency channel is assigned by using 1ch, 6ch, and 11ch as an example of a combination of the assignment candidates for a frequency channel. In contrast, it may be possible to assign a frequency channel by using other combinations of assignment candidates, such as a combination of 2ch, 7ch, and 12ch or a combination of 1ch, 5ch, 9ch, and 13ch, as a combination of the assignment candidates for a frequency channel. Furthermore, it may be possible to compare a metric obtained at the k-th step as an assignment result for a frequency channel using a certain combination of assignment candidates (for example, a combination of 1ch, 6ch, and 11ch) with a metric obtained at the k-th step as an assignment result for a frequency channel using another combination of assignment candidates (for example, a combination of 2ch, 7ch, and 12ch), and employ an assignment result with a smaller metric.

[6] In the above-described embodiments, a frequency channel is assigned to each of APs by using a symmetric matrix that includes, as elements, amounts of interference in each of the APs caused by the other APs and by using an upper triangular matrix or a lower triangular matrix generated from the symmetric matrix. In contrast, it may be possible to process a "value group" that includes, as elements, the amounts of interference in each of the APs caused by the other APs based on the symmetric property of propagation channels, and may use the processed value group instead of the upper triangular matrix and the lower triangular matrix to assign a frequency channel to each of the APs. That is, the symmetric matrix is one example of the value group that includes, as the elements, the amounts of interference in each of the APs caused by the other APs, and the upper triangular matrix and the lower triangular matrix are examples of a value group processed based on the symmetric property of the propagation channels. Furthermore, the matrix operation units 102 and 212 are examples of an "interfered amount processing unit" that processes a value group that includes, as the elements, the amounts of interference in each of the APs caused by the other APs based on the symmetric property of the propagation channels. That is, the value group that includes the amounts of interference as the elements does not necessarily have to be represented by a matrix. It may be possible to directly perform, on the value group, a process equivalent to the operation performed on the matrix.

[7] In the above-described embodiments, the symmetric matrix includes, as the elements, the amounts of interference in each of the APs caused by the other APs. In contrast, the symmetric matrix may include, as the elements, the amounts of interference in each of the APs caused by the other APs and amounts of interference in each of the APs caused by other interference sources. Examples of the other interference sources include a radio wave output source, such as a wireless terminal or a microwave, which outputs radio waves at a frequency included in a frequency band used in the subject system.

Figure 10:
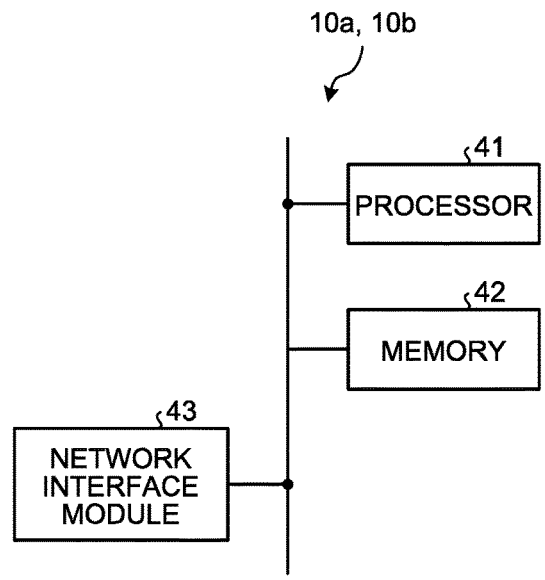
FIG. 10 is a diagram illustrating a hardware configuration example of the control stations.

[8] The control stations 10a and 10b are implemented by a hardware configuration as described below. FIG. 10 is a diagram illustrating a hardware configuration example of the control station. As illustrated in FIG. 10, the control stations 10a and 10b include, as hardware components, a processor 41, a memory 42, and a network interface module 43. Examples of the processor 41 include a central processing unit (CPU), a digital signal processor (DSP), and a field programmable gate array (FPGA). Furthermore, the control stations 10a and 10b may include a large scale integrated circuit (LSI) including the processor 41 and a peripheral circuit. Examples of the memory 42 include a RAM, such as an SDRAM, a ROM, and a flash memory.

The matrix operation unit 102, the channel assignment unit 103, and the normalization unit 105 are implemented by the processor 41. The wired communication unit 101 is implemented by the network interface module 43.

Figure 11:
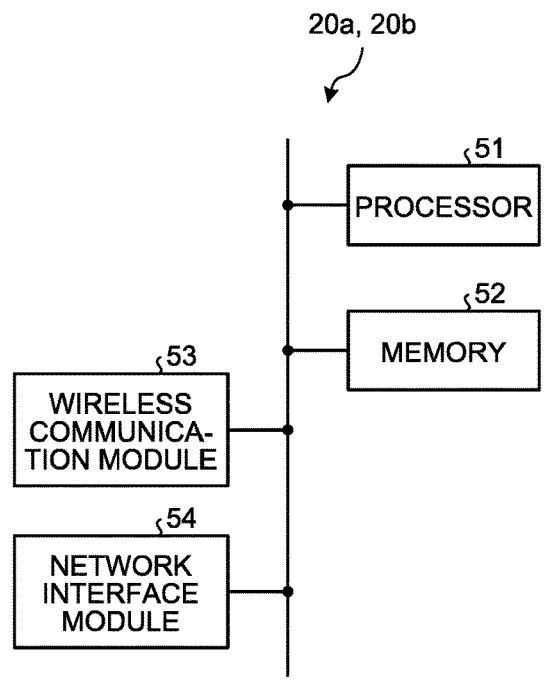
FIG. 11 is a diagram illustrating a hardware configuration example of the wireless access points.

[9] The APs 20a and 20b are implemented by a hardware configuration as described below. FIG. 11 is a diagram illustrating a hardware configuration example of the wireless access point. As illustrated in FIG. 11, the APs 20a and 20b include, as hardware components, a processor 51, a memory 52, a wireless communication module 53, and a network interface module 54. Examples of the processor 51 include a CPU, a DSP, and an FPGA. Furthermore, the APs 20a and 20b may include an LSI including the processor 51 and a peripheral circuit. Examples of the memory 52 include a RAM, such as an SDRAM, a ROM, and a flash memory.

The reception power measurement unit 203, the channel setting units 206 and 215, the matrix operation unit 212, and the channel assignment unit 213 are implemented by the processor 51. The measurement result recording unit 204 is implemented by the memory 52. The antenna 201, the wireless reception unit 202, and the wireless transmission unit 207 are implemented by the wireless communication module 53. The wired communication units 205 and 211 are implemented by the network interface module 54.

According to a disclosed embodiment, it is possible to improve the throughput of a wireless communication system.

All examples and conditional language recited herein are intended for pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A channel assignment apparatus comprising:
a network interface module; and
a processor coupled to the network interface module, wherein
the processor is configured to execute to:
represent a value group by, a symmetric matrix, the value group including, as elements, amounts of interference respectively corresponding to wireless access points;
perform a row exchange and a column exchange in the symmetric matrix based on magnitude of each of the amounts of interference;
generate one of a upper triangular matrix and a lower triangular matrix from the symmetric matrix in which the row exchange and the column exchange are performed; and
assign a frequency channel to each of the wireless access points by using one of the upper triangular matrix and the lower triangular matrix in accordance with a predetermined algorithm for selecting an optimal assignment candidate corresponding to the magnitude of each of the amounts of interference from among a plurality of assignment candidates for the frequency channel.

2. The channel assignment apparatus according to claim 1, wherein
the processor is further configured to further execute instructions to normalize the amounts of interference, based on transmission power values respectively corresponding to the wireless access points, and
the processor is further configured to generate one of the upper triangular matrix and the lower triangular matrix from the symmetric matrix that includes the normalized amounts of interference as the elements.

3. A wireless communication system comprising:
a plurality of first network interface modules respectively included in a plurality of wireless access points;
a plurality of first processors respectively coupled to the first network interface modules;

a second network interface module included in a channel assignment apparatus; and
a second processor coupled to the second network interface module, wherein
each of the plurality of first processors is configured to report amounts of interference respectively corresponding to the wireless access points to the channel assignment apparatus,
the second processor is configured to represent a value group by a symmetric matrix, the value group including, as elements, the reported amounts of interference, perform a row exchange and a column exchange in the symmetric matrix based on magnitude of each of the reported amounts of interference, generate one of a upper triangular matrix and a lower triangular matrix from the symmetric matrix in which the row exchange and the column exchange are performed, assign a frequency channel to each of the wireless access points by using one of the upper triangular matrix and the lower triangular matrix in accordance with a predetermined algorithm for selecting an optimal assignment candidate corresponding to the magnitude of each of the amounts of interference from among a plurality of assignment candidates for the frequency channel, and notify each of the wireless access points of assignment result for the frequency channel, and each of the plurality of first processors is configured to set a transmission channel to the frequency channel based on the assignment result.

4. A channel assignment method comprising:
representing a value group by a symmetric matrix, the value group including, as elements, amounts of interference respectively corresponding to wireless access points;
performing a row exchange and a column exchange, in the symmetric matrix based on magnitude of each of the amounts of interference;
generating one of a upper triangular matrix and a lower triangular matrix from the symmetric matrix in which the row exchange and the column exchange are performed; and
assigning a frequency channel to each of the wireless access points by using one of the upper triangular matrix and the lower triangular matrix in accordance with a predetermined algorithm for selecting an optimal assignment candidate corresponding to the magnitude of each of the amounts of interference from among a plurality of assignment candidates for the frequency channel.

* * * * *